United States Patent [19]

Takada et al.

[11] Patent Number: 4,978,549
[45] Date of Patent: Dec. 18, 1990

[54] METHOD FOR PRODUCING TOMATO PRODUCTS

[75] Inventors: Norihisa Takada; Saburo Kojima; Tadaaki Wakayama; Kyoko Omi; Nobuyuki Kobayashi; Hideyuki Okada, all of Numata, Japan

[73] Assignee: Kikko Foods Corporation, Tokyo, Japan

[21] Appl. No.: 329,834

[22] Filed: Mar. 28, 1989

[30] Foreign Application Priority Data

Mar. 28, 1988 [JP] Japan .................................. 63-72018
Mar. 28, 1989 [JP] Japan .................................. 63-72017

[51] Int. Cl.$^5$ .............................................. A23L 2/00
[52] U.S. Cl. ..................................... 426/489; 426/520
[58] Field of Search ............... 426/478, 489, 492, 520, 426/615

[56] References Cited

U.S. PATENT DOCUMENTS

| | | | |
|---|---|---|---|
| 1,874,181 | 8/1932 | Gavin | 426/489 |
| 1,978,078 | 10/1934 | Eberts | 426/388 |
| 2,089,071 | 8/1937 | Roberts | 426/489 |
| 2,092,729 | 9/1937 | Eberts | 426/481 |
| 2,890,961 | 6/1959 | Davis | 426/481 |
| 3,172,770 | 3/1965 | Miller | 426/489 |
| 3,549,384 | 7/1970 | Walker et al. | 426/520 |

FOREIGN PATENT DOCUMENTS

| | | |
|---|---|---|
| 59-91867 | 5/1984 | Japan . |
| 59-91868 | 5/1984 | Japan . |
| 961639 | 9/1982 | U.S.S.R. ............................. 426/489 |

*Primary Examiner*—George Yeung
*Attorney, Agent, or Firm*—Banner, Birch, McKie & Beckett

[57] ABSTRACT

A process for manufacturing tomato juice which retains less amount of compounds giving out a green odor by heating crushed tomatoes rapidly to 60°–85° C., particularly at a heating rate of 4° C./sec or higher, holding the heated tomatoes at the above temperature for 2–15 minutes, more heating them to over 85° C. and then extracting the juice, where the above heating conditions are also used for pretreatment of tomatoes for recovering natural tomato essence followed by collecting vapors containing tomato aroma components, often by flashing tomatoes in a vacuum tank, rectifying the vapor and condensing the aroma components, often by a condenser.

2 Claims, 1 Drawing Sheet

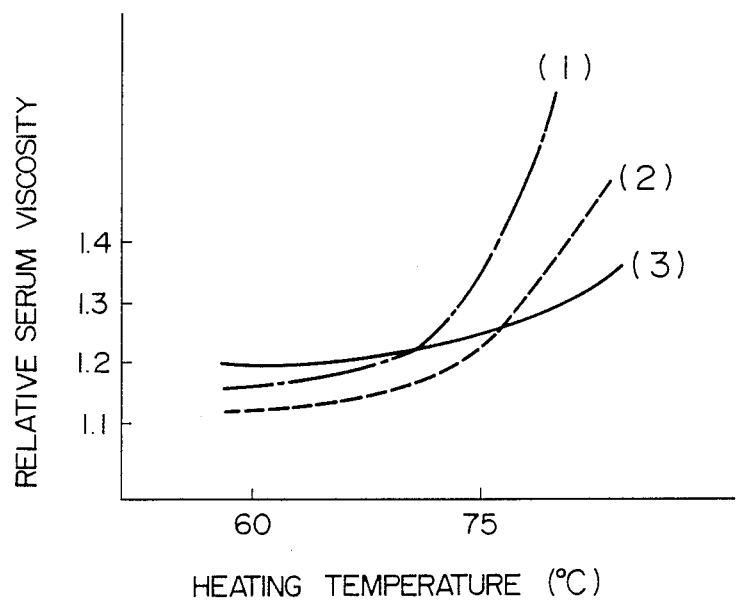

METHOD FOR PRODUCING TOMATO PRODUCTS

BACKGROUND OF THE INVENTION

1. Field of the Invention

The present invention relates to methods for producing tomato products such as tomato juice, tomato essence etc., more particularly this invention provides a method for producing tomato juice under a certain quality standard from various tomatoes having different characteristics, and also a method for producing new tomato essence retaining less amount of components giving out a green odor.

2. Description of the Prior Art

Practical means to do something for taste adjustment of tomato juice is only adding salt during the process. Therefore, the quality of tomato juice is strongly influenced by the quality of raw tomatoes. Since a balance among sugar content, acidity and salt contents is a basic factor to decide the goodness of the taste of tomato juice, a way to gain the proper balance from raw material and keep it during the processing is a great concern for the people who are in charge of production of tomatoes and processing them. Furthermore, since another factor, the consistency also gives a great influence on the taste of tomato juice, control of the taste is possible by adjusting the consistency during processing.

According to our study, it was found that mouth feeling of tomato juice is classified in three different types based on a principle analysis shown in Table 1.

TABLE 1

| Type | sensory expression | relative serum viscosity | precipitate weight ratio |
|---|---|---|---|
| A | rich body, and a heavy feeling to swallow | high | large |
| B | rich body, and a light feeling to swallow | low | large |
| C | poor body, and a light feeling to swallow | low | small |

The relative serum viscosity is a relative number of the flow time of a sample to that of water in Cannon-Fenske viscometer. The weight of precipitate obtained after centrifugation at $12800 \times g$ at 4° C. for 30 minutes was compared to the original sample weight in a ratio and the ratio was shown as the precipitate weight ratio in terms of a percent. This parameter shows the amount of dietary fibers and its water holding capacity, and also implies the bodiness of tomato juice and the swelling volume of fibers in the intestines. As shown in table 1, a pair of a low relative serum viscosity and a high precipitate weight ratio should be obtained in order to produce B type of tomato juice which has a rich bodiness but a light feeling to swallow. This B type provides dietary fibers more to the consumers without making them feel the texture of juice too heavy.

A usual processing method of tomato juice showing B type of rheological property is to crush tomatoes, heat them at a low temperature with a tubular heater and extract the juice intensively with commercially available extractors such as screw type, paddle type or butterfly type. However, this processing method allows lipoxygenases and pectin-degrading enzymes of tomatoes work strongly, and these reactions generate a strong green odor and produce a strong synelysis, resulting in a poor tomato juice. In particular the use of firm tomatoes makes it difficult to produce B type of tomato juice because of the above problems.

On the other hand, commercial industries employ two ways to manufacture tomato juice. One is seasonal pack that extracts the juice from raw tomatoes and manufactures the final product during the season. The other way is reconstituted pack which concentrates the tomato juice during the season, stores them and later on dilutes and prepares tomato juice during post-harvest season. It is well recognized that reconstituted tomato juice is inferior to the seasonal pack.

As one of the methods to improve the quality of reconstituted tomato juice, fortifying natural tomato essence has been already reported. However the technology to recover tomato essence upon a certain design has not yet been developed. It is well known that tomato fruits biosynthesize various tomato aroma components in their metabolic ripening pathways and also generate new aroma constituents through various enzymatic reaction in crushed tomatoes during processing. Important aroma components which are generated during processing of tomatoes are $C_6$ compounds such as n-hexanol, cis-3-hexenol, etc. These show a sensory characteristics providing so-called "freshness" as long as they present at a certain concentration. High concentration of those components above a certain level inversely gives unfavorable aroma profile such as green odor. $C_6$ compounds will be concentrated in natural recovered tomato essence. However, a recovering method of essence which regulates the relative concentration of $C_6$ compounds to those of other aroma compounds, or a processing method which recovers tomato essence containing strong intrinsic tomato aroma while depressing the green odor to a certain level, has not yet been found. At the same time, it is very difficult to separate $C_6$ compounds only out of a recovered tomato essence and adjust the concentration later.

SUMMARY OF THE INVENTION

It is therefore an object of the present invention to provide a method manufacturing tomato juice which is rich in the body but with a light texture for swallowing while suppressing a green odor. It is a further object of the present invention to provide a method to produce natural tomato essence retaining natural pleasant tomato aroma and less green odor, and to apply this essence for manufacturing reconstituted tomato juice.

Thus, according to the present invention, (1) A method for producing tomato juice which comprises crushing a tomato fruit, rapidly heating the crushed tomato to 60° to 85° C., extracting the juice from the crushed tomato and then heating the juice at a temperature higher than 85° C.

(2) A method for producing tomato juice which comprises crushing a tomato fruit, heating the crushed tomato to 60° to 85° C. in a heating rate of 4° C./sec or higher, keeping the crushed tomato at said temperature for 2 to 15 minutes, extracting the juice from said crushed tomato and heating the juice at a temperature higher than 85° C.

(3) A method for producing a tomato essence which comprises recovering steam generated from a crushed tomato rapidly heated to 60° to 85° C. or a juice extracted from the heated crushed tomato, condensing the steam and then rectifying the condensate to recover the tomato essence.

(4) A method for producing a tomato essence which comprises recovering and condensing steam generated from crushed tomato heated to 60° to 85° C. in a heating rate of 4° C./sec or higher or steam generated by flashing at a temperature higher than 85° C. a tomato juice extracted from the heated crushed tomato, rectifying the condensate by rectifier and condensing the distillate to recover the tomato essence.

BRIEF DESCRIPTION OF THE DRAWING

The attached drawing shows relative serum viscosity of three type tomato juices obtained by using a heating condition according to the method of the present invention.

DETAILED DESCRIPTION OF THE INVENTION

The inventors intensively studied and found (1) in order to manufacture a tomato juice providing more beneficial dietary fibers and smoothness of texture for consumers, a process efficiently regulating the enzymatic reaction of internal polygalacturonases of tomatoes can process firm tomatoes which have advantages for farmers to increase their tomato yield, (2) the regulation of enzymatic aroma generating reaction by lipoxygenase, etc. can be accomplished through altering the heating condition of the tomatoes after crushed, resulting in the control of generation of green odor. Tomato essence with a certain characteristics can be thereafter recovered from the heated tomato crushes.

First of all, the processing method of tomatoes in the present invention is described in detail below.

In the present invention, fresh raw tomatoes are washed and sorted as usual. Thereafter, the tomatoes are crushed or chopped, and then immediately fed into a heating tank where a given temperature is already set up, and heated immediately to 60°–85° C. and holded for a given period, for instance 2–15 minutes to produce a maceration effect by endo-polygalacturonase. Since the enzyme activity of endo-polygalacturonase is varied depending on the tomato cultivar, and harvest time, this new process controls the reaction of endopolygalacturonase by regulating heating temperature and the holding time of the tomato crushes. At this time the heating should be immediately done, for instance heating rate of 4° C./sec or higher is desirable. Thereafter, the crushes are heated again to over 70° C. preferably 75°–85° C. to inactivate endo-polygalacturonase and keep the processing line in good sanitary condition, and then the juice are extracted. At the next step, the extracted tomato juice are heated to over 85° C. in order to inactivate at this time other pectin-degrading enzymes. After deaerated, the resulted tomato juice will be sterilized and filled in a container by hot-fill or aseptic-fill, or concentrated to tomato concentrate by various technology such as evaporation, freeze-concentration, or membrane concentration.

Activity of endo-polygalacturonase in tomatoes varies depending on the cultivars or harvest time. As shown in table 2, the activity varied double depending on the sample.

TABLE 2

| Cultivar | The beginning of season | The middle of season | The late of season |
| --- | --- | --- | --- |
| A | 12.0 | 21.0 | 35.2 |
| B | 46.0 | 44.0 | 36.0 |
| C | 24.0 | 33.0 | 39.0 |

TABLE 2-continued

| Cultivar | The beginning of season | The middle of season | The late of season |
| --- | --- | --- | --- |
| D | 19.0 | 28.0 | 25.0 |

The unit of enzyme activity was expressed by:

[log(the decrease of viscosity of pectin solution)/log(the reaction time)] × 100.

Processing plant finds some different quality of tomatoes including the amount of endo-polygalacturonase at the beginning, the middle, and the late of season. Therefore, the successful control of enzymatic reaction of polygalacturonase through changing the reacting condition can result in manufacturing tomato juice under a constant quality standard including the rheological property.

Endo-polygalacturonase degrades water-soluble or insoluble pectins in tomato juice. Its influence on the relative serum viscosity representing the characteristics of soluble pectin molecules was as follows. In our experiments, tomato crushes were continuously fed into or discharged out of a heating tank at a constant feed rate, where a given volume of crushes were already in and continuously heated at a certain temperature. Following the heating, the macerate was fed to a finisher to obtain the tomato juice. The relative serum viscosity of the juice was shown in the attached drawing. The drawing shows the relative serum viscosity of juices from three different cultivars which used the heating method mentioned by the present invention. Although there are some differences among those cultivars, the relative serum viscosity decreases when the tomato crushes were heated under 75° C., which is a temperature zone stimulating the enzymatic reaction. When endo-polygalacturonase reacts with insoluble solids so much that it results in watery texture of juice. Therefore, the condition for enzymatic reaction or preheating should be previously determined so that the certain quality and quantity of insoluble solids carried in tomato juice by a given extracting strength, or the value of precipitate weight ratio meets the specification of the juice.

Utilizing the heating procedure of the present invention, endo-polygalacturonase activity properly functions and at the same time this condition allows tomato internal lipoxygenase inactivate during the rapid heating at a heating rate of 4° C./sec or higher. Therefore, generation of green odor which appears through degradation of lipids or carotenoids by lipoxygenase is suppressed so that the aroma profile of tomato juice becomes closer to that of tomato fruits themselves.

Quality of tomato juice obtained by the present invention was shown in Table 3. There was no significant difference in precipitate weight ratio, but the relative serum viscosity of juice processed by this invention was lower than that by usual processing method. In another word, tomato juice rich in body but with a light swallowing feeling was obtained.

TABLE 3

|  | Present invention | Usual method |
| --- | --- | --- |
| Precipitate weight ratio (%) | 8.1 | 8.0 |
| Relative serum viscosity | 1.2* | 1.4* |
| Brix | 5.4 | 5.3 |
| Titratable acidity (%) | 0.39 | 0.38 |
| pH | 4.28 | 4.28 |

TABLE 3-continued

| | Present invention | Usual method |
|---|---|---|
| Color (Lb/a) | 12.73 | 12.85 |
| Vitamin C (mg %) | 11.73 | 11.35 |

*The difference is significant at $\alpha = 1\%$.

The tomato juice obtained by the present invention contained a lower concentration of $C_6$ and $C_7$ compounds in aroma constituents, indicating that the generation of green odor through lipoxygenase reaction was suppressed. The contents of main $C_6$ and $C_7$ components are shown in Table 4 as relative peak area in gas chromatogram using PEG-20M capillary column.

TABLE 4

| $C_6$, $C_7$ compounds | Present invention | Usual method |
|---|---|---|
| 2-Hexanone | 0.06 | 0.87 |
| 2-Heptanone | 0.86 | 1.54 |
| trans-2-Hexenal | 0.58 | 1.43 |
| trans-2-Heptenal | 1.07 | 1.76 |
| n-Hexanol | 1.66 | 2.07 |
| cis-3-Hexenol | 9.60 | 15.57 |

Tomato juices produced by present method and usual method were evaluated to see the preference using triangle test and ranking test by 20 panels. Tomato juice obtained by the present invention was significantly preferred.

Next, the production method of tomato essence is mentioned in detail below.

As previously mentioned, the aroma constituents in tomato product consists of the aroma components from raw tomato fruits themselves and also the components generated during processing. They are composed of approximately 160 kinds of compounds such as aliphatic compounds, aromatic compounds, terpenoids and so forth. Typical compounds generated during the process include n-Hexanal, n-Hexanol, cis-3-Hexenal, cis-3-Hexenol, trans-3-Hexenol, etc, which provide green odor or so-called freshness in tomato products. However, the control of generation of green odor during the process needs the regulation of reaction itself of natural enzymes such as lipoxygenase. Lipoxygenase catalizes degradation of lipids, carotenoids in tomatoes, generating various aroma components including $C_6$ compounds. The optimum temperature of lipoxygenase presents around 40° C. Therefore, when tomato crushes are intended to be heated to over 40° C., the heating rate to pass through that temperature zone is a key to control the lipoxygenase reaction.

In the present invention, tomato crushes are rapidly heated from the ambient temperature to 60°-85° C. (heating rate of 4° C./sec or higher) to inactivate lipoxygenase, and then tomato essence is recovered from the crushes. It is very important to apply a high heating rate. If slower heating rate such as 2° C./sec is applied in this temperature zone, the generation of green odor is intensive. Therefore, a recycle type of tubular heater or a rotary coil type of heating equipment is more suitable than a single pass type of tubular heater which heating rate is rather slow. Heating of the crushes using the above equipment at a temperature zone, 60°-85° C., or more particularly 60°-75° C. suppresses the generation of not only green odor but also cooking odor.

Following the step generating aromas, the heated tomatoes are forwarded to an essence recovery step. The vapor containing aroma components is obtained out of the heated tomato crushes or the extracted juice. In practice, the vapor generated by flashing the crushes or juice in a flash tank or evaporators is collected. At the time, the higher vacuum generates the larger volume of vapor, but it is preferable to keep the inner temperature of flashing tank over 65° C. to maintain a good sanitary condition. If no microbiological problems are found, a lower temperature can be applied for flashing. Maintaining the temperature of feed-material be higher, for instance over 85° C. is preferable so as to produce an adequate volume of vapor while keeping 65° C. inside the flashing tank. The vapor is thereafter rectified in a generally applicable rectifier and condensed in a condenser, producing the herein invented natural tomato essence retaining intrinsic aroma of tomatoes. The tomato essence recovered in such way is filtered through a microfilter to remove microbes if necessary. An organic membrane such as cellulose acetate, polyethersulphone, nitrocellulcse or ceramic filter, etc. can be used for the filtering treatment.

Properly added tomato essence can improve the quality of tomato juice including reconstituted juice from various tomato intermediates, for instance a frozen and stored tomato puree or paste which is concentrated by evaporator, an aseptically stored single strength of tomato juice, tomato juice concentrate which is preconcentrated by reverse osmosis and after concentrated further by evaporator, and so forth.

Application of natural tomato essence obtained by the present invention is not limited to tomato juice, but useful for any kind of tomato products. They include vegetable juice, mixed beverages of vegetable with fruit, fermented vegetable beverages, soups, tomato sauces, whole tomatoes, tomato puree, crushed tomatoes, diced tomatoes and other prepared tomato products, etc.

Analysis by gas chromatography was performed for a natural tomato essence recovered from tomato juice in which generation of green odor was suppressed by the present invention. And the same analysis was done for tomato essence from juice retaining a strong green odor which was processed by usual slower heating process. The gas chromatography was carried out using PEG-20M capillary column. The carrier gas was nitrogen gas. The oven temperature was increased from 60° C. to 200° C. The FID detector was used. Table 5 shows the peak area of $C_6$ compounds causing green odor and other compounds among low boiling components on the gas chromatogram. This peak area of each component is expressed by the relative concentration based on the peak area of an internal standard, 2,3-Xylenol in terms of a percent. This analysis showed that the tomato essence from a process using the present invention contained a less concentration of $C_6$, $C_7$ compounds represented by No. 2, 28, 29 peaks and still rich in other aroma components.

TABLE 5

| Peak No. | Retention time (min) | Chemical name | Peak area | |
|---|---|---|---|---|
| | | | Slow heating method | Present method |
| 5 | 2.32 | 2-Butanol | 3.15 | 2.67 |
| 6 | 2.40 | Toluene, Propanol | 0.55 | 0.37 |
| 10* | 2.71 | 2-Hexanone | 0.87 | 0.06 |
| 11 | 2.76 | Dimethyl sulfide | 0.65 | 1.34 |
| 12 | 2.90 | 1-Propen-3-ol | 2.11 | 2.58 |
| 13 | 3.12 | 3-Penten-2-one | 0.27 | 0.23 |
| 14 | 3.24 | Ethylbenzene | 0.27 | 0.23 |

TABLE 5-continued

| Peak No. | Retention time (min) | Chemical name | Peak area Slow heating method | Peak area Present method |
|---|---|---|---|---|
| 15 | 3.31 | 1-Butanol | 0.26 | 0.40 |
| 16* | 3.48 | 2-Heptanone | 1.54 | 0.86 |
| 17 | 4.16 | 3-Methyl-1-Butanol | 5.71 | 5.72 |
| 18* | 4.34 | trans-2-Hexenal | 1.43 | 0.58 |
| 19 | 4.90 | p-Cymene | 2.00 | 0.60 |
| 21 | 5.70 | Terpinolene | 0.91 | 2.19 |
| 23* | 6.42 | trans-2-Heptenal | 1.76 | 1.07 |
| 25 | 6.69 | 2-Methy-2-hepten-6-one | 9.74 | 8.51 |
| 26* | 7.24 | n-Hexanol | 2.07 | 1.66 |
| 28* | 8.09 | cis-3-Hexenol | 15.57 | 9.60 |
| 29* | 8.52 | trans-2-Hexenol | 1.33 | 0.96 |
| Sum of the area of C6 and c7 (marked*) components | | | 24.57 | 14.79 |

Following the analysis, these tomato essences were added in a reconstituted tomato juice from tomato concentrate by 0.1% and the juices were evaluated using a ranking test by 15 panels. The preference ranked the juice added invented tomato essence as the best one and the juice added an essence having strong green odor as the next, and the juice without any essence as the worst.

The present invention will be mentioned below by way of Examples.

EXAMPLE 1

Two hundreds kg of raw tomatoes were washed and sorted as usual. Those tomatoes had 33 units of endo-polygalacturonase. The tomatoes were crushed with a disintegrater, and continuously pumped into and discharged out of a steam jacketted tank where the heating temperature was kept at 65° C. in order to heat the tomato crushes rapidly. The heating rate was 4° C./sec. After holded for 5 minutes in the tank, the macerates were heated to 75° C. with a tubular heater and fed to a Brown type finisher, where the tomato juice was obtained. Then the juice was heated to 90° C. and deaerated. After that, the juice was sterilized as usual with a plate heat exchanger and filled in a container.

EXAMPLE 2

Two hundreds kg of raw tomatoes were washed and sorted as usual. Those tomatoes had 33 units of endo-polygalacturonase. The tomatoes were crushed with a disintegrater, and continuously pumped into and discharged out of a recycle type of tubular heater where the tomatoes were immediately heated to 65° C., and where the holding volume gave a 5 minutes holding time. The heating rate was 4° C./sec. Thereafter, the macerates were heated to 75° C. with a single-pass type of tubular heater and fed to a Brown type finisher, where the tomato juice was obtained. Then the juice was heated to 90° C. at the time and deaerated. After that, the juice was sterilized as usual with a plate heat exchanger and filled in a container.

EXAMPLE 3

Raw tomatoes were washed and sorted as usual. Thereafter, the tomatoes were crushed with a disintegrater, and continuously pumped into and discharged out of a steam jacketted tank having a stirrer where the heating temperature was kept at 65° C. in order to heat the tomato crushes rapidly. Then the juice was extracted from the heated macerates. After heated more to 93° C., the tomato juice was fed to a flashing tank at 4 ton/hour and flashed under 265 mm Hg (gauge) of vacuum. Under this condition, a vapor retaining tomato aroma compounds was generated at 34 Kg/hour. Then the vapor was rectified under a reflaxing ratio, 4.0 and condensed thereafter by a condenser, resulting in 5 Kg of the natural tomato essence.

EXAMPLE 4

Raw tomatoes were washed and sorted as usual. Thereafter, the tomatoes were crushed with a disintegrater, and continuously pumped into and discharged out of a recycle type of tubular heater where the heating temperature was kept at 65° C. in order to heat the macerates rapidly. The tomato juice was extracted from the heated macerates, heated to 85° C. and flashed at 65° C. The vapor was rectified and a condensed 10 Kg of natural tomato essence was obtained.

EXAMPLE 5

Raw tomatoes were washed, crushed and processed to tomato juice as usual. The juice was concentrated by a thin layer falling film evaporater at 30°-40° C., filled in aseptic bags and frozen at −30° C. After some period of storage, this frozen tomato concentrate was thawed and diluted to 5 Brix with water. Then the natural tomato essence recovered in EXAMPLE 3 was added by 0.2% to make a reconstituted tomato juice.

EXAMPLE 6

Raw tomatoes were washed, crushed and processed to tomato juice as usual. The juice was then sterilized, cooled down and filled aseptically in 200 t of aseptic bulk storage tanks. On the other hand, tomato juice was concentrated by evaporator and hot-filled in 5 Kg cans. Later on, some tomato juice was taken out of the bulk storage tank and blended with a 5 brix diluted juice from canned concentrate by 50%. Then the recovered natural tomato essence was added to the reconstituted tomato juice by 0.2%.

EXAMPLE 7

Raw tomatoes were washed, crushed and processed to tomato juice as usual. The juice was then double concentrated by a single passing style of reverse osmosis membrane concentrator, thereafter concentrated to 25 brix by a thin layer falling film evaporator using a following condition. The concentrates was frozen to store.

| Condition for reverse osmosis concentration: | |
|---|---|
| Membrane: ZF-99 (PCI), Membrane area | 3.44 m$^2$ |
| Module (inner diameter) | 12.5 mm |
| Feed rate of juice | 300 l/hr |
| Brix of fed juice | 4.8 brix |
| Feed temperature of juice | 50° C., |
| Feed pressure of juice | 53 Kg/cm$^2$ |
| Discharge pressure out of the membrane system | 49 Kg/cm$^2$ |
| Ratio of concentration | 2 |
| Condition for evaporation | |
| Equipment | Luwa evaporator |
| Feed rate of juice | 50 l/hr |
| Vacuum | 72 cm Hg (gauge), |
| Steam pressure | 0.3 Kg/cm$^2$ |

On the other hand, 5 Kg of 500 fold of natural tomato essence was obtained by the same method mentioned in EXAMPLE 3. Furthermore, this essence was sterilized by a filter treatment and stored at refrigerated temperature. Later on, the tomato concentrate was diluted to 4.8 brix and added with recovered tomato essence by 0.1% to produce a reconstituted tomato juice.

EXAMPLE 8

Tomato mixed juice with vegetable was prepared as follows. First of all, 28 brix tomato concentrate was diluted to 4.8 brix juice. Herein, other vegetable juices such as carrot, celery, parsley, lettuce, turnip, red beet, ginseng and spices were blended at a certain ratio. Thereafter the natural tomato essence recovered by EXAMPLE 3 was added to a final concentration 0.1%, resulting in improvement of aroma profile of vegetable juice.

What is claimed is:

1. A method for producing tomato juice which comprises crushing a tomato fruit, heating the crushed tomato to 60° to 85° C. at a heating rate of 4° C./sec. or higher, keeping the crushed tomato at said temperature for 2 to 15 minutes, extracting the juice from said crushed tomato and heating the juice at a temperature higher than 85° C. to inactivate residual enzymes, and subjecting the juice to deaeration and heat sterilization.

2. A method for producing a tomato essence which comprises recovering and condensing steam generated from a crushed tomato heated to 60° to 85° C. in a heating rate of 4° C./sec or higher or steam generated by flashing at a temperature higher than 85° C. a tomato juice extracted from the heated crushed tomato, rectifying the condensate in a rectifier to produce distillate vapor and condensing the distillate vapor to recover the tomato essence.

* * * * *

UNITED STATES PATENT AND TRADEMARK OFFICE
CERTIFICATE OF CORRECTION

PATENT NO. : 4,978,549

DATED : December 18, 1990

INVENTOR(S) : Norihisa Takada et al.

It is certified that error appears in the above-identified patent and that said Letters Patent is hereby corrected as shown below:

On the title page item [30] Foreign Application Priority Data, the second entry, "Mar. 28, 1989" should read -- Mar. 28, 1988 --

Signed and Sealed this

Twenty-second Day of December, 1992

Attest:

DOUGLAS B. COMER

*Attesting Officer*   *Acting Commissioner of Patents and Trademarks*